(12) United States Patent
Zhou et al.

(10) Patent No.: US 11,156,900 B2
(45) Date of Patent: Oct. 26, 2021

(54) LENS MODULE AND MOBILE TERMINAL

(71) Applicant: BEIJING XIAOMI MOBILE SOFTWARE CO., LTD., Beijing (CN)

(72) Inventors: Kai Zhou, Beijing (CN); Hongzhi Jin, Beijing (CN); Tao Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 4 days.

(21) Appl. No.: 16/696,718

(22) Filed: Nov. 26, 2019

(65) Prior Publication Data

US 2020/0409235 A1  Dec. 31, 2020

(30) Foreign Application Priority Data

Jun. 28, 2019  (CN) .......................... 201910578918.7

(51) Int. Cl.
| | |
|---|---|
| *G03B 9/12* | (2021.01) |
| *G02B 26/02* | (2006.01) |
| *H01F 7/14* | (2006.01) |
| *G03B 17/12* | (2021.01) |

(52) U.S. Cl.
CPC ................ *G03B 9/12* (2013.01); *G02B 26/02* (2013.01); *H01F 7/14* (2013.01); *G03B 17/12* (2013.01)

(58) Field of Classification Search
CPC .................................... G03B 9/12; G03B 9/04
See application file for complete search history.

(56) References Cited

U.S. PATENT DOCUMENTS

| | | | | |
|---|---|---|---|---|
| 5,432,576 A | * | 7/1995 | SanGregory | ............. G03B 9/14 396/449 |
| 6,072,634 A | * | 6/2000 | Broome | ................. G02B 5/005 359/637 |
| 8,040,584 B2 | * | 10/2011 | Okita | ...................... G03B 9/06 359/234 |

(Continued)

FOREIGN PATENT DOCUMENTS

| | | |
|---|---|---|
| CN | 108181775 A | 6/2018 |
| EP | 3 333 628 A1 | 6/2018 |

(Continued)

OTHER PUBLICATIONS

Extended European Search Report dated Jun. 26, 2020 in European Patent Application No. 20150981.7, 9 pages.

(Continued)

*Primary Examiner* — Clayton E. LaBalle
*Assistant Examiner* — Leon W Rhodes, Jr.
(74) *Attorney, Agent, or Firm* — Oblon, McClelland, Maier & Neustadt, L.L.P.

(57) ABSTRACT

The present disclosure provides a lens module and a mobile terminal. The lens module can include a lens component, a mounting bracket, a blade assembly movably connected to the mounting bracket, and a driving assembly connected to the blade assembly. The blade assembly is provided with at least two apertures, and the at least two apertures have different diameters. The lens component is mounted to the mounting bracket, and the blade assembly is configured to rotate and switch the apertures to correspond to the lens component under driving of the driving assembly, such that an axis of one of the apertures coincides with an optical axis of the lens component.

17 Claims, 10 Drawing Sheets

(56) References Cited

U.S. PATENT DOCUMENTS

| | | | |
|---|---|---|---|
| 9,794,459 B1 * | 10/2017 | Kim | G03B 5/00 |
| 10,645,262 B2 * | 5/2020 | Oh | G02B 7/02 |
| 10,812,697 B2 * | 10/2020 | Lee | H04N 5/2252 |
| 2006/0153560 A1 | 7/2006 | Nakano | |
| 2011/0206364 A1 * | 8/2011 | Han | G03B 9/14 |
| | | | 396/463 |
| 2013/0077950 A1 * | 3/2013 | Liu | G03B 9/06 |
| | | | 396/497 |
| 2017/0302831 A1 | 10/2017 | Kim et al. | |
| 2018/0164537 A1 | 6/2018 | Lee | |
| 2018/0343370 A1 | 11/2018 | Park et al. | |
| 2019/0020797 A1 | 1/2019 | Park et al. | |
| 2020/0132979 A1 * | 4/2020 | Rho | H04N 5/2254 |
| 2020/0150380 A1 | 5/2020 | Lee | |

FOREIGN PATENT DOCUMENTS

| | | |
|---|---|---|
| JP | 9-325382 A | 12/1997 |
| TW | 201823835 A | 7/2018 |

OTHER PUBLICATIONS

Office Action dated Jul. 5, 2021 in China Patent Application No. 201910578918.7 (with English translation); 19 pgs.

\* cited by examiner

LENS MODULE AND MOBILE TERMINAL

CROSS REFERENCE TO RELATED APPLICATION

This application claims priority to Chinese Patent Application Serial No. 201910578918.7, filed on Jun. 28, 2019, the entire content of which is incorporated herein by reference.

TECHNICAL FIELD

The present disclosure relates to a technical field of electronic devices, and more particularly to a lens module and a mobile terminal.

BACKGROUND

Commonly, electronic devices can be provided with a lens module for image capturing. The electronic device can also be provided with an aperture that can guide the light into the lens module, where a size of the aperture can affect photographing experience. In the related art, the lens module with a large aperture can guide more light in to shorten shutter time, so as to better shoot a moving object. Additionally, the lens module with the large aperture can take photos with shallow depth of field, which can blur the background and highlight the subject, contributing to a good imaging effect. The shutter time is long with using a lens module with a small aperture, and the lens module with a small aperture can be used to capture images with deep depths of field, such as car tracks, star tracks, and the like, and to obtain clear image of objects within multiple depths of field.

However, the aperture of the electronic device has a fixed size, which results in unchanged parameters of the image information taken by the electronic device, limits the photographing effect of the lens module and the application scenarios of the lens module, leading to poor user experience.

SUMMARY

The present disclosure provides a lens module and a mobile terminal. According to a first aspect of embodiments of the present disclosure, a lens module is provided. The lens module can include a mounting bracket, a lens component mounted to the mounting bracket, and a blade assembly movably connected to the mounting bracket and provided with at least two apertures of different diameters. The lens module can further include a driving assembly connected to the blade assembly that can drive the blade assembly to rotate and switch the at least two apertures to correspond to the lens component, such that an axis of one of the at least two apertures coincides with an optical axis of the lens component.

According to embodiments of the present disclosure, another lens module can be provided that includes a mounting bracket, a lens component mounted to the mounting bracket, and a changeable aperture member rotatably connected to the mounting bracket and having a first aperture and a second aperture of different sizes. Further, a driver can drive the changeable aperture member to enable an axis of one of the first aperture and the second aperture to coincide with an optical axis of the lens component.

According to a another aspect of embodiments of the present disclosure, a mobile terminal is provided that can include a processor, a memory configured to store an executable instruction of the processor, and a lens module establishing a communication connection between the processor. The lens module includes a mounting bracket defining a hole, a lens member mounted to the mounting bracket and located under the hole, a changeable aperture member rotatably connected to the mounting bracket, located over the hole, and having a first aperture and a second aperture of different sizes. Further, a driver can drive the changeable aperture member to enable an axis of one of the first aperture and the second aperture to coincide with an optical axis of the lens member.

It should be understood that, the forgoing general description and the detailed description hereinafter are only exemplary and explanatory, and do not limit the present disclosure.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
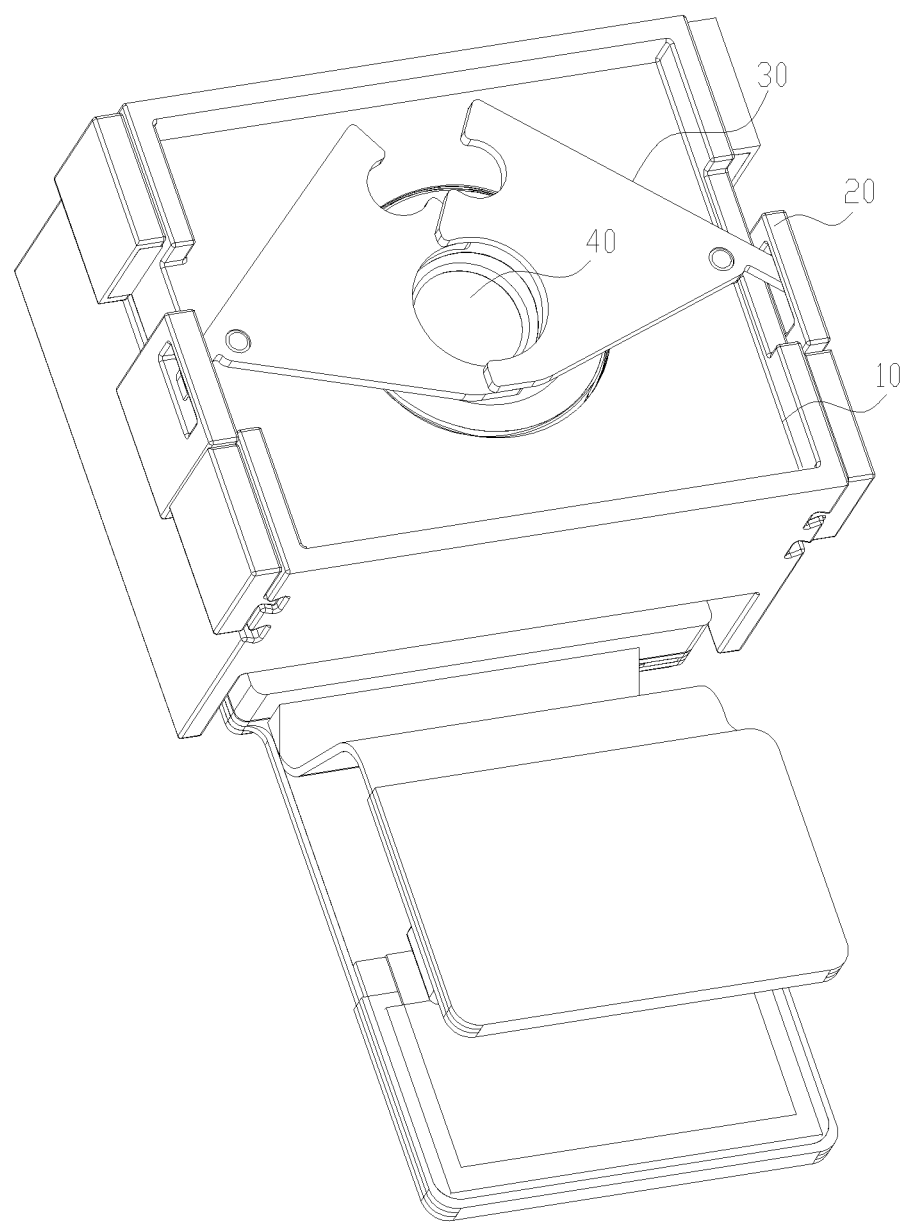
FIG. 1 is a schematic view of a lens module illustrated according to an exemplary embodiment.

Exemplary embodiments will be illustrated in detail herein, and the examples thereof are shown in the accompanying drawings. When the following description refers to the accompanying drawings, unless otherwise specified, the same or similar elements are denoted by the same numerals in the different accompanying drawings. Implementations described in the exemplary embodiments do not represent all implementations consistent with the present disclosure. On the contrary, they are merely examples of a device and a method consistent with some aspects of the present disclosure, as elaborated in the appended claims.

The terms used in the present disclosure are only for purpose of description of particular embodiments, and are not intended to limit the present disclosure. The singular form "a", "the" and "this" used in the present disclosure and the appended claims is also intended to include the plural form, unless other meanings are explicitly expressed in the context. It should be understood that, the term "and/or" used herein refers to include any or all of the possible combinations of one or a plurality of listed related items.

It should be understood that, although the terms "first", "second", "third" may be employed by the present disclosure to describe various information, these information should not limited by these terms. These terms are only used to distinguish the information of the same type from each other. In an optional implementation, first information may be referred to as second information without departing from the scope of the present disclosure, and similarly, the second information may also be referred to as the first information. Depending on the context, the word "if" used herein may be interpreted as "when . . . ", "upon . . . " or "in response to determination".

Embodiments of the present disclosure provide a lens module. The lens module can include a mounting bracket, a lens component mounted to the mounting bracket, and a changeable aperture member rotatably connected to the mounting bracket and having a first aperture and a second aperture of different sizes. Further, a driver can drive the changeable aperture member to enable an axis of one of the first aperture and the second aperture to coincide with an optical axis of the lens component. For example, the changeable aperture member can be a blade assembly 30 as shown in the drawings, and the driver can be a driving assembly 20 as shown in the drawings.

Embodiments of the present disclosure provide a mobile terminal. The mobile terminal can include a processor, a memory configured to store an executable instruction of the processor, and a lens module establishing a communication connection between the processor. The lens module includes a mounting bracket defining a hole, a lens member mounted to the mounting bracket and located under the hole, a changeable aperture member rotatably connected to the mounting bracket, located over the hole, and having a first aperture and a second aperture of different sizes. Further a driver can drive the changeable aperture member to enable an axis of one of the first aperture and the second aperture to coincide with an optical axis of the lens member. For example, the changeable aperture member can be a blade assembly 30 as shown in the drawings, and the driver can be a driving assembly 20 as shown in the drawings.

Figure 2:
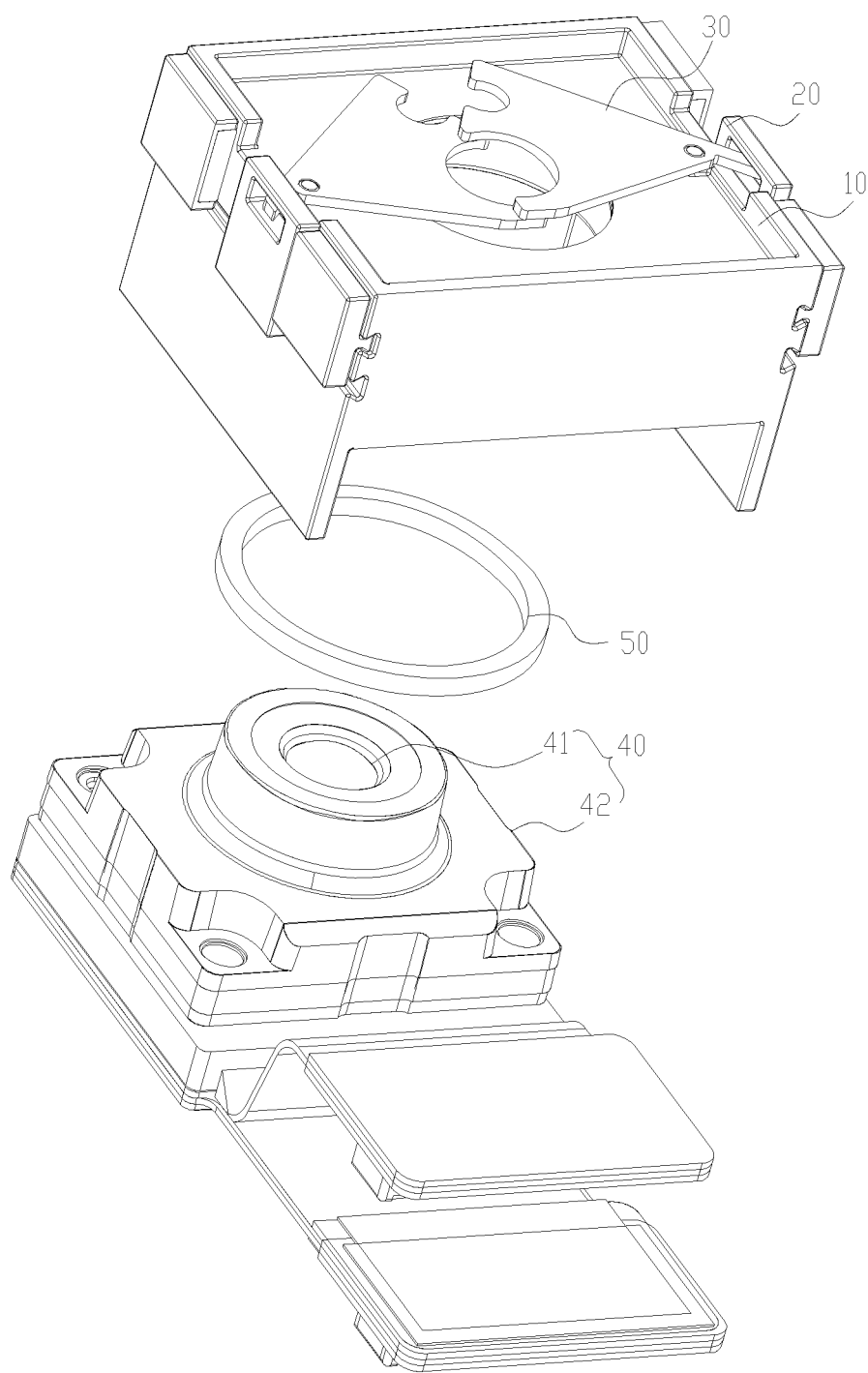
FIG. 2 is an exploded view of a lens module illustrated according to an exemplary embodiment.

As illustrated in FIGS. 1 and 2, a lens module includes a lens component 40, a mounting bracket 10, a blade assembly 30 movably connected to the mounting bracket 10, and a driving assembly 20 connected to the blade assembly 30. The blade assembly 30 is provided with at least two apertures 33, and the at least two apertures 33 have different diameters. The lens component 40 is mounted to the mounting bracket 10, and the blade assembly 30 is configured to rotate and switch the apertures 33 to correspond to the lens component 40 under driving of the driving assembly 20, such that an axis of one of the apertures 33 coincides with an optical axis of the lens component 40.

The lens component 40 is mounted to the mounting bracket 10, and relative position of the lens component 40 and the mounting bracket 10 is fixed. The blade assembly 30 is provided with two or more apertures 33, the apertures 33 have different diameters to achieving apertures 33 of graded different sizes, and adjacent apertures 33 are spaced apart. The blade assembly 30 is movably connected to the mounting bracket 10 and is able to move or rotate relative to the mounting bracket 10. The apertures 33 arranged to the blade assembly 30 are switched along with movement of the blade assembly 30, such that the lens component 40 can adapt different apertures 33 according to environmental changes and photographing requirements, resulting in convenient switching and a good matching effect.

Optionally, the mounting bracket 10 is provided with an accommodating space and a lens hole 12 in communication with the accommodating space, the lens component 40 is mounted in the accommodating space, and the optical axis of the lens component 40 is parallel to an axis of the lens hole 12. At least a part of the lens component 40 is located in the accommodating space, and the optical axis direction of the lens component 40 is parallel to or coincides with the axis of the lens hole 12. Optionally, a lens portion of the lens component 40 protrudes from, is flush with, or is sunken relative to the lens hole 12. The blade assembly 30 is mounted to the mounting bracket 10 and movable outside the lens hole 12, so as to cause the apertures 33 of the blade assembly 30 to coincide with the lens hole 12.

Figure 3:
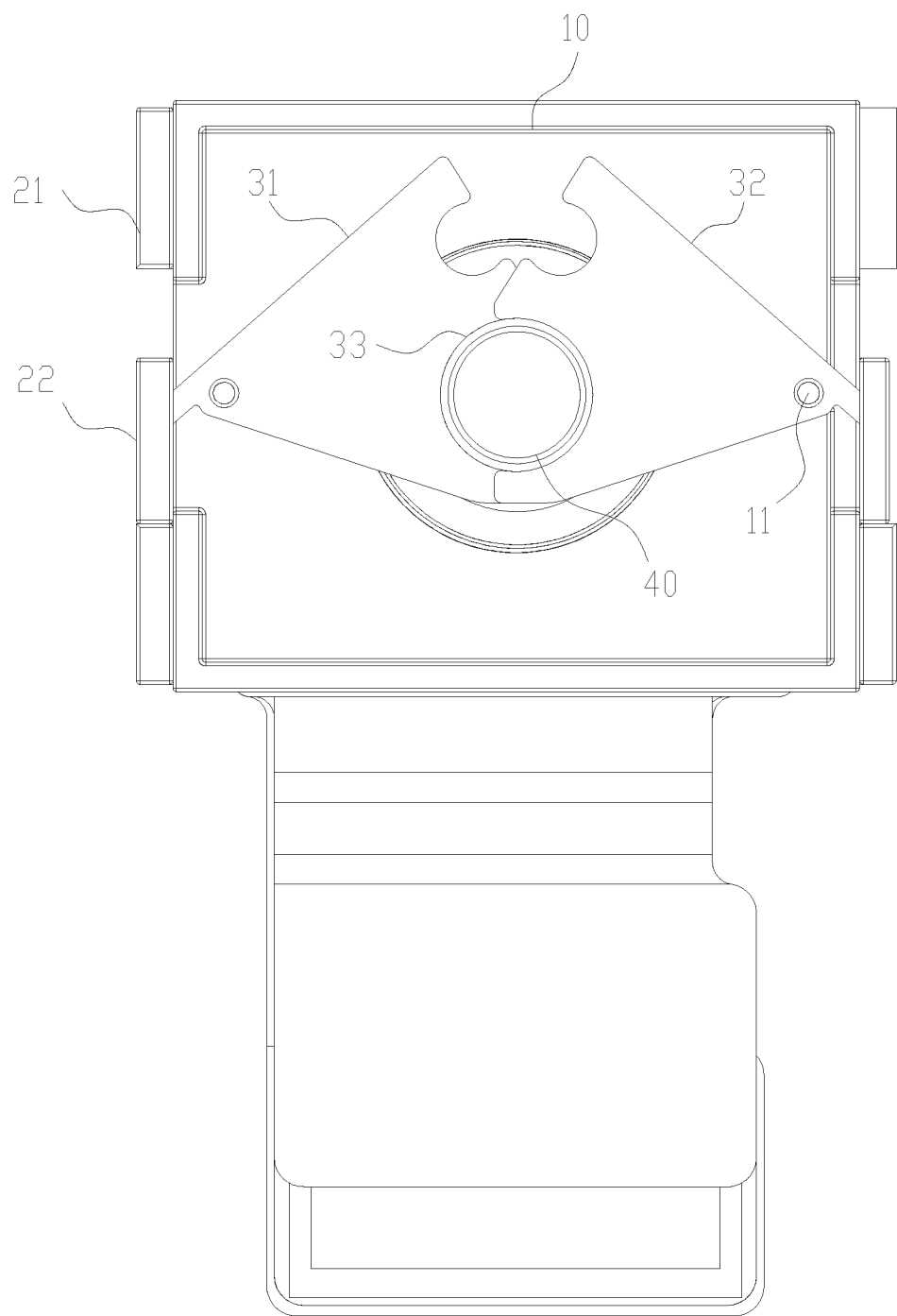
FIG. 3 is a schematic view of a blade assembly illustrated according to an exemplary embodiment, in which the blade assembly is switched into a large aperture state.
Figure 4:
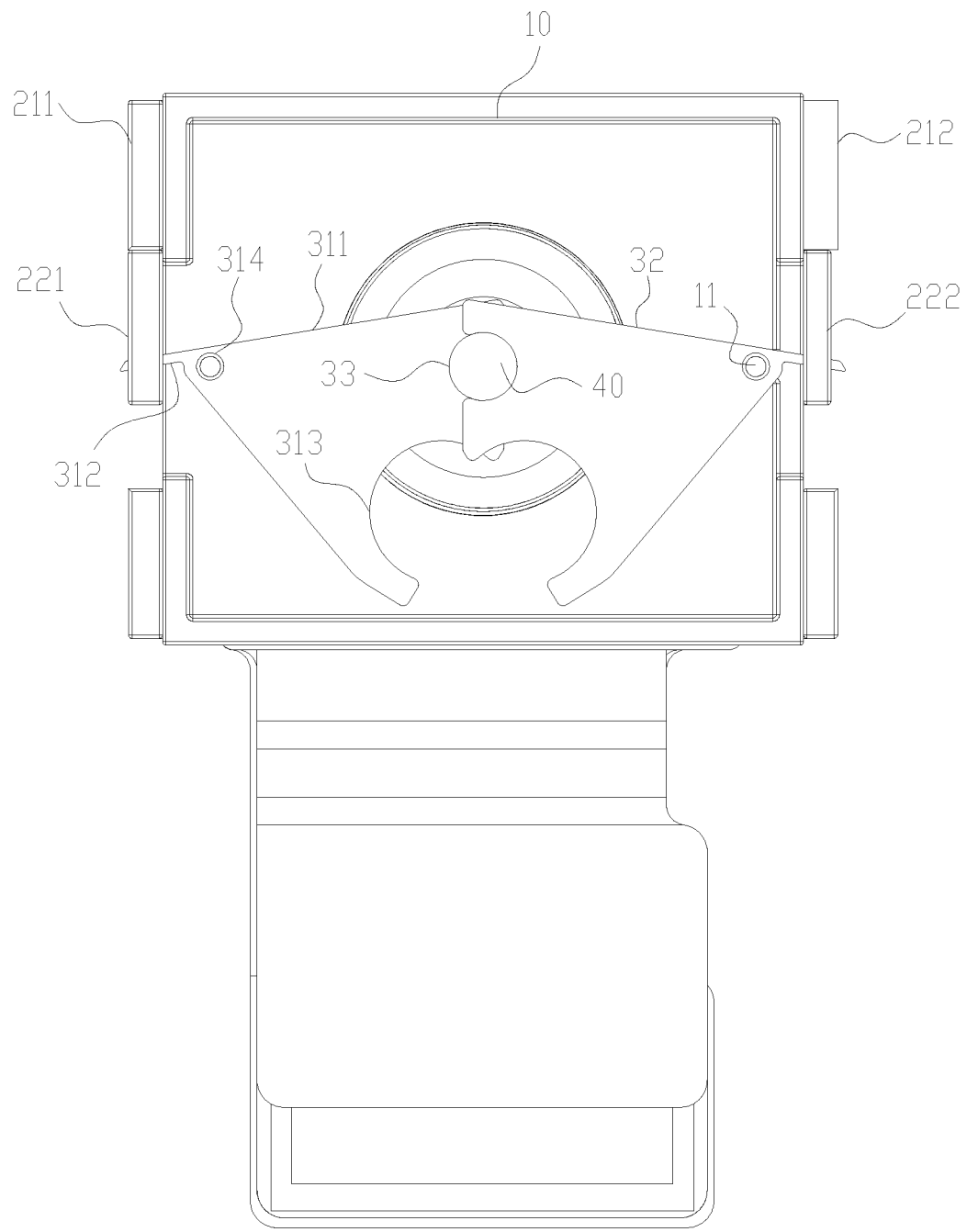
FIG. 4 is a schematic view of a blade assembly illustrated according to an exemplary embodiment, in which the blade assembly is switched into a small aperture state.

As illustrated in FIGS. 3 and 4, the blade assembly 30 is connected to the driving assembly 20 and is movable under the driving of the driving assembly 20. In an optional embodiment, the driving assembly 20 drives the whole the blade assembly 30 to move or rotate. For example, the blade assembly 30 is provided with one plate-like structural member, and the blade assembly 30 is provided with two apertures 33. The blade assembly 30 rotates relative to the mounting bracket 10 and causes different apertures 33 to switch to match the lens component 40. Alternatively, the driving assembly 20 drives the blade assembly 30 to locally or partially move, so as to cause the different apertures 33 on the blade assembly 30 to be switched to each other, resulting in convenient driving and control.

In an optional embodiment, the blade assembly 30 includes a driving rotation part connected to the driving assembly 20 and a driven rotation part mounted to the mounting bracket 10, and the driving rotation part rotates under the driving of the driving assembly 20 and drives the driven rotation part to rotate. For example, the driven rotation part is rotatably connected to the mounting bracket 10, and the driving rotation part and the driven rotation part are in mesh connection through a gear structure or the driving rotation part is rotatably connected to the driven rotation part through a pin, such that the driving rotation part and the driven rotation part are linked. The optical axis of the lens component 40 coincides with the axis of the aperture 33, resulting in good photographing effect of the lens component 40 and good user experience.

In an embodiment, the blade assembly 30 includes a first blade 31 and a second blade 32 that are rotatably connected to the mounting bracket 10, the driving assembly 20 drives the first blade 31 and the second blade 32 to rotate and align so that the aperture 33 is defined in a closed-up position of the first blade 31 and the second blade 32.

The blade assembly 30 is provided with two separate members, i.e., the first blade 31 and the second blade 32. Further, the first blade 31 and the second blade 32 rotate relative to the mounting bracket 10 to define a range of movement for rotating to open or rotating to close. The first blade 31 and the second blade 32 rotate relative to each other under the driving of the driving assembly 20, and edge portions of the two superpose or overlap each other to define at least one closed aperture 33. Under a driving force of the driving assembly 20, the first blade 31 and the second blade 32 rotate relative to each other. Optionally, the first blade 31 and the second blade 32 rotate in opposite directions, the first blade 31 rotates clockwise, and the second blade 32 rotates counterclockwise. Optionally, the first blade 31 and the second blade 32 rotate in a same direction. In an optional implementation, the first blade 31 and the second blade 32 both rotate clockwise or counterclockwise.

The first blade 31 at least partially overlap the second blade 32, the first blade 31 and the second blade 32 define one closed aperture 33 in a projection direction, and the axis of the aperture 33 coincides with the optical axis of the lens component 40. The first blade 31 and the second blade 32 continue to rotate by a preset angle, such that the first blade 31 and the second blade 32 define another closed aperture 33 in the projection direction, and the axis of the aperture 33 coincides with the optical axis of the lens component 40.

Figure 5:
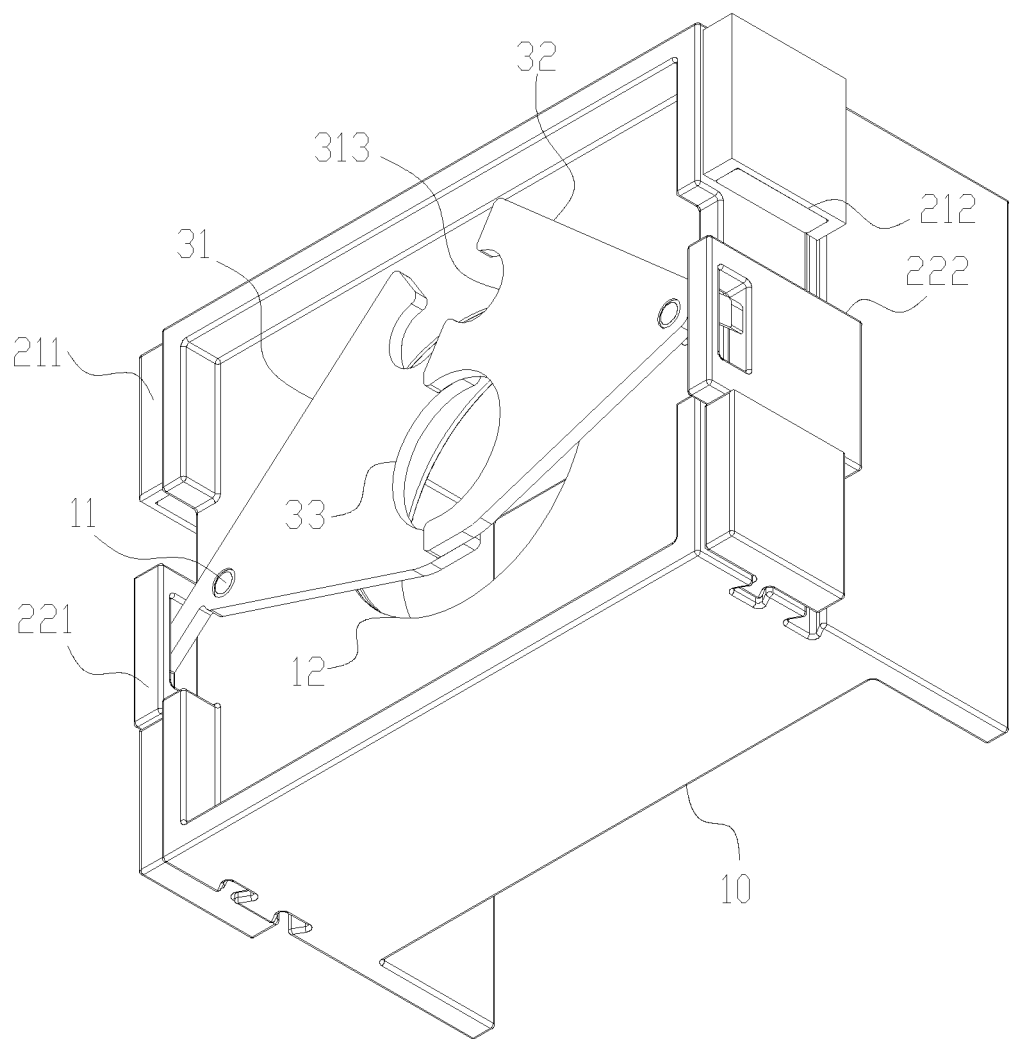
FIG. 5 is a perspective view of a blade assembly illustrated according to an exemplary embodiment, in which blade assembly is movably connected to the mounting bracket.
Figure 6:
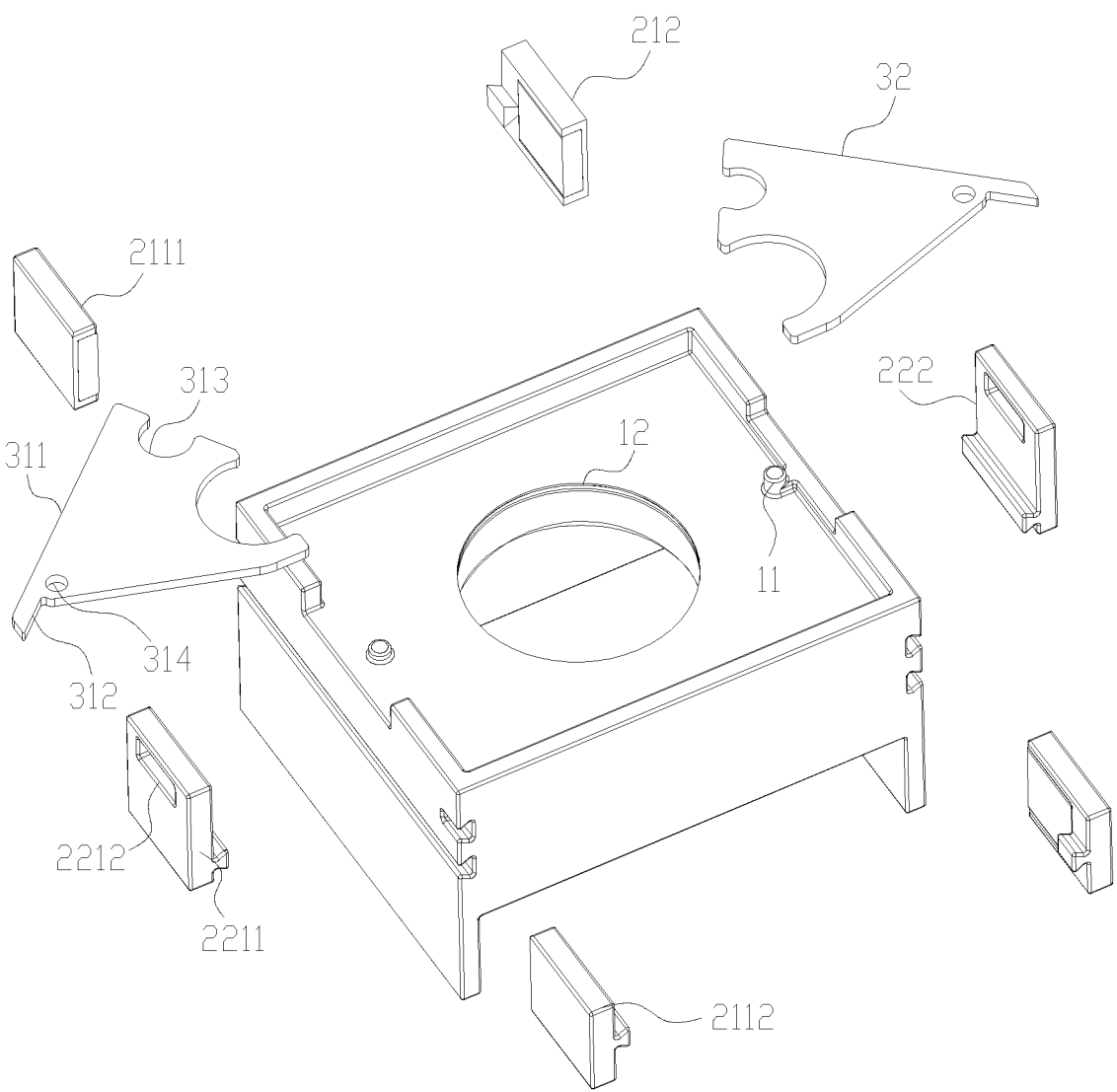
FIG. 6 is an exploded view of a blade assembly and a mounting bracket illustrated according to an exemplary embodiment.

As illustrated in FIGS. 5 and 6, the first blade 31 and the second blade 32 are oppositely arranged and movably connected to the mounting bracket 10. Optionally, the first blade 31 and the second blade 32 are symmetrically arranged. In an optional implementation, the first blade 31 and the second blade 32 have the same structure and size and are symmetrically arranged, and the first blade 31 and the second blade 32 can rotate synchronously by the same amount of rotation, contributing to good synchronization and high degree of matching. Alternatively, the first blade 31 and the second blade 32 are complementarily arranged. In an optional implementation, the first blade 31 and the second blade 32 have complementary structures. For example, the first blade 31 has a protruded structure, and the second blade 32 has a recessed structure. The first blade 31 and the second blade 32 define at least one aperture 33 during relative movement, and the axis of the aperture 33 coincides with the optical axis of the lens component 40. Moreover, the driving assembly 20 enables the blade assembly 30 to achieve the switching of different apertures 33 during the movement by driving the first blade 31 and the second blade 32 to rotate relative to each other, contributing to good switching effect.

It is worth mentioning that, the first blade 31 and the second blade 32 can also separately rotate under the driving of the driving assembly 20. For example, the first blade 31 rotates by an angle to switch a part of the aperture, and the second blade 32 then rotates by a corresponding angle and the second blade 32 and the first blade 31 partially close, so as to complete the aperture. Certainly, the second blade 32 rotates first, and the first blade 31 rotates later, which belongs to a similar situation.

The first blade 31 and the second blade 32 are rotatably connected to the mounting bracket 10. In an optional embodiment, the first blade 31 includes a main body part 311 and a protruding part 312 extending from the main body part 311. The main body part 311 is rotatably connected to the mounting bracket 10, and the main body part 311 defines two or more arc-shaped notches 313 at an edge thereof. The protruding part 312 drives the main body part 311 to rotate under the driving of the driving assembly 20, and the first blade 31 and the second blade 32 align and form the aperture 33 at the arc-shaped notches 313.

The main body part 311 is rotatably connected to the mounting bracket 10. In an optional embodiment, the first blade 31 is provided with a rotary shaft protruding from the main body part 311, and the rotary shaft is detachably connected to the main body part 311. Alternatively, the rotary shaft is integrally formed with the main body part 311. The first blade 31 is rotatably connected to the mounting bracket 10 through the rotary shaft, contributing to a convenient rotation connection. In an optional embodiment, the main body part 311 defines a hole 314, and the mounting bracket 10 is rotatably connected to the hole 314. The mounting bracket 10 is provided with a shaft 11, and the hole 314 is defined in the main body part 311 and is fitted over the shaft 11, so as to enable the first blade 31 to rotate about the shaft 11. Correspondingly, the second blade 32 can also rotate relative to the mounting bracket 10.

The protruding part 312 protrudes from the main body part 311 to form a b-like structure, the driving assembly 20 is drivingly connected to the protruding part 312, and the main body part 311 covers at least a part of the mounting bracket 10. The arc-shaped notch 313 is defined at an edge of the main body part 311. Correspondingly, the first blade 31 and the second blade 32 are each provided with the arc-shaped notch 313. During relative rotation between the first blade 31 and the second blade 32 driven by the driving assembly 20, the arc-shaped notch 313 of the first blade 31 and the arc-shaped notch 313 of the second blade 32 close up or at least partially overlap each other, to form a complete aperture 33.

Figure 7:
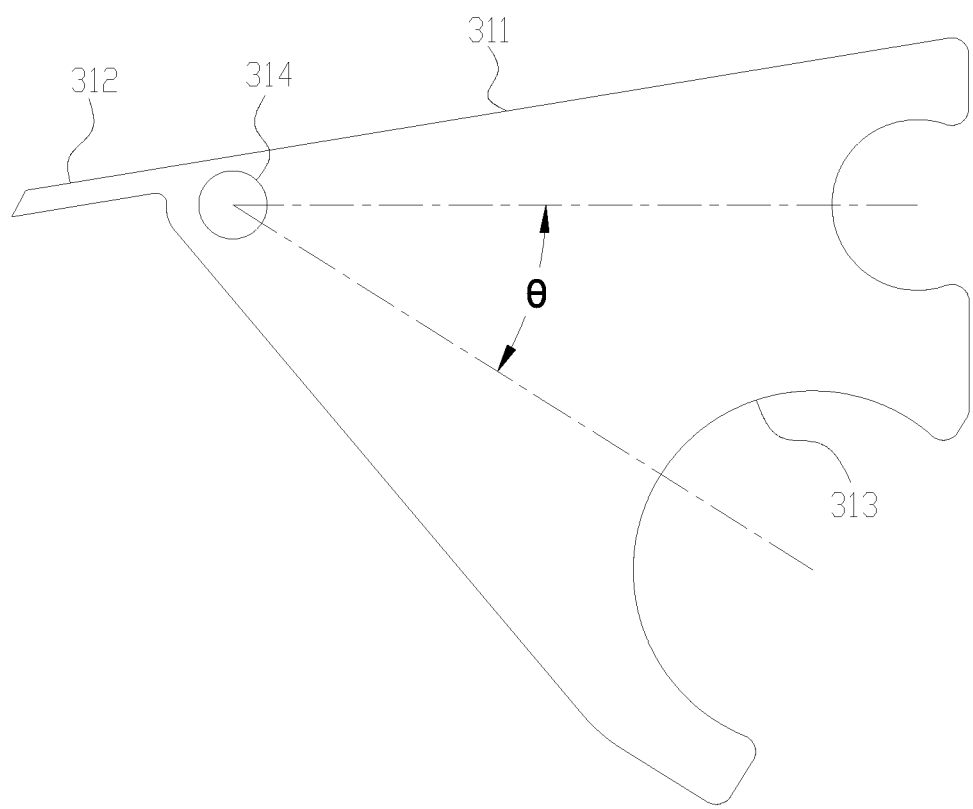
FIG. 7 is a schematic view of a first blade illustrated according to an exemplary embodiment.

As illustrated in FIGS. 5 and 7, in a specific embodiment, two or more arc-shaped notches 313 are defined at the edge of the main body part 311. Optionally, the arc-shaped notch 313 is configured as a portion of a circular structure. A part of the arc-shaped notch 313 is configured in the shape of a semicircle, and a size of an opening of the arc-shaped notch 313 is greater than or equal to a size of a diameter of the semicircle. When the first blade 31 and the second blade 32 close up or align, the circular portions of the arc-shaped notches 313 cooperate to form the aperture 33. The arc-shaped notch 313 is arranged at the edge of the main body part 311, contributing to a convenient movement.

In an optional embodiment, distances from centers of the arc-shaped notches 313 to a centerline of the hole 314 are identical. The first blade 31 rotates about the shaft 11 in the hole 314, which defines an arc-shaped rotating area. The center of a circular portion of each arc-shaped notch 313 is spaced apart from the hole 314 by the identical distance. Correspondingly, arc-shaped notches 313 are located in the same turning radius, such that each arc-shaped notch 313 can be used to define a corresponding aperture 33, and the axis of the aperture 33 coincides with the optical axis of the lens component 40, which has good switching effect. In an optional embodiment, the first blade 31 is provided with two arc-shaped notches 313, an angle defined by centerlines of the two arc-shaped notches 313 and the axis of the hole 314 is denoted by θ (30 degrees≤θ≤45 degrees). Specifically, the angle θ defined by the centerlines of the two arc-shaped notches 313 and the axis of the hole 314 is 30 degrees, 32 degrees, 35 degrees, 40 degrees, 45 degrees, and the like.

As illustrated in FIGS. 3 and 4, the driving assembly 20 is connected to the blade assembly 30 and drives the blade assembly 30 to move, so as to switch the aperture 30 of the blade assembly 30 to match the lens component 40. In an embodiment, the driving assembly 20 includes a driving set 21 mounted to the mounting bracket 10 and a movable set 22 slidably arranged to the mounting bracket 10. The blade assembly 30 is movably connected to the movable set 22, and the movable set 22 slides along the mounting bracket 10 and drives the blade assembly 30 to rotate under a driving force of the driving set 21.

The driving set 21 is mounted to the mounting bracket 10 and can drive reciprocating sliding of the movable set 22 along the mounting bracket 10. The blade assembly 30 is connected to the movable set 22 and moves along with the movable set 22. Alternatively, the blade assembly 30 rotates relative to the mounting bracket 10 under the driving of the movable set 22. The driving set 21 drives the movable set 22 to move through a direct or indirect connection, and the driving is easy.

Optionally, the driving set 21 is directly connected to the movable set 22 and drives the movable set 22 to move. In an optional implementation, the driving set 21 and the movable set 22 are configured as a structure of direct connection such as a structure of connection between a pinion and rack, a structure that a screw drives a nut to move. Optionally, the driving set 21 is indirectly connected to the movable set 22 and drives the movable set 22 to move. In an optional implementation, the driving set 21 is drivingly connected to the movable set 22 through magnetic induction. The driving set 21 and the movable set 22 are in a magnetic connection based on a magnetic attraction principle. For example, the driving set 21 is configured as an electromagnet, the movable set 22 is configured as a sliding block made of ferromagnetic material, and the driving set 21 attracts the movable set 22 to move in an energized state.

In an embodiment, the mounting bracket 10 defines at least one sliding groove 13, the blade assembly 30 is rotatably connected to the shaft 11, and a part of the driving assembly 20 is slidably arranged in the sliding groove 13 and drives the blade assembly 30 to rotate. The movable set 22 is slidably arranged in a corresponding sliding groove 13 to determine a sliding track of the movable set 22. The blade assembly 30 rotates about the shaft 11 under the driving of the movable set 22, contributing to the convenient driving.

The blade assembly 30 is connected to the movable set 22 and rotates or moves under the driving of the movable set 22. In an optional embodiment, the driving set 21 includes a first driving member 211 mounted to the mounting bracket 10, and the movable set 22 includes a first movable member 221. At least a part of the blade assembly 30 is connected to the first movable member 221, and the first movable member 221 drives the blade assembly 30 to rotate under the driving of the first driving member 211.

The first driving member 211 can be directly or indirectly connected to the first movable member 221, to drive the first movable member 221 to slide along the sliding groove 13 of the mounting bracket 10. In an optional implementation, the first driving member 211 and the first movable member 221 constitute a structure of direct connection, such as a structure with a feed screw and nut, a structure with a pinion and rack. In an optional implementation, the first driving member 211 and the first movable member 221 constitute a structure of indirect connection, such as a magnetic driving structure based on magnetic field characteristics. The blade assembly 30 is connected to the first movable member 221 and rotates when the first movable member 221 moves, to switch the different apertures 33 of the blade assembly 30. The blade assembly 30 wholly rotates or wholly rotates in a linked manner under the driving of the first movable member 221, contributing to the high switching efficiency.

As illustrated in FIGS. 5 and 6, in an optional embodiment, the first driving member 211 includes a first electromagnet 2111 and a second electromagnet 2112 that are oppositely arranged, at least a part of the first movable member 221 is located between the first electromagnet 2111 and the second electromagnet 2112, and the first movable member 221 slides along the mounting bracket 10 under the action of a magnetic force of the first electromagnet 2111 or the second electromagnet 2112.

Optionally, at least a part of the first movable member 221 is made of ferromagnetic material, to enable the first movable member 221 to move under the action of the magnetic force of one of the first electromagnet 2111 and the second electromagnet 2112. For instance, the first movable member 221 contains but not limited to a ferromagnetic material such as iron, cobalt, nickel, and the like. Optionally, at least a part of the first movable member 221 is made of a magnetic material. For example, the first movable member 221 is internally mounted with a permanent magnet material such as a lodestone, a magnetic iron, and the like.

The first electromagnet 2111 and the second electromagnet 2112 are mounted to the mounting bracket 10 and arranged oppositely. When one of the first electromagnet 2111 or the second electromagnet 2112 is energized to generate a magnetic field, the first movable member 221 moves under the action of the magnetic force of the first electromagnet 2111 or the second electromagnet 2112 and abuts against the first electromagnet 2111 or the second electromagnet 2112. Optionally, the blade assembly 30 is provided with two apertures 33, and when the first movable member 221 is attracted by the first electromagnet 2111 or the second electromagnet 2112, the blade assembly 30 moves under the driving of the first movable member 221 and switches between the two apertures 33. The apertures 33 can be stably switched with high switching accuracy.

The blade assembly 30 includes the first blade 31 and the second blade 32, and the first blade 31 and the second blade 32 both can rotate under the driving of the driving set 21. In an embodiment, the driving set 21 includes a second driving member 212 mounted to the mounting bracket 10 and arranged opposite the first driving member 211, and the movable set includes a second movable member 222 arranged opposite the first movable member 221. The blade assembly 30 is connected to the first movable member 221 and the second movable member 222 separately, and the second movable member 222 drives the blade assembly 30 to rotate under the driving of the second driving member 212.

The first driving member 211 and the second driving member 212 separately drive the blade assembly 30 to rotate. Optionally, the first blade 31 is connected to the first movable member 221, and the second blade 32 is connected to the second movable member 222. The first driving member 211 drives the first movable member 221 to rotate, the second driving member 212 drives the second movable member 222 to rotate, such that the first blade 31 and the second blade 32 close up relative to each other to define the aperture 33 at the closed-up position.

In an optional embodiment, the first driving member 211 and the second driving member 212 are symmetrically arranged. The structures of the first driving member 211 and the second driving member 212 are symmetrically arranged, contributing to high synchronization of the two, and good controllability of a rotating angle. Optionally, the first blade 31 and the second blade 32 are symmetrically arranged, contributing to high accuracy of the rotating angle and a good matching effect of the aperture 33.

Figure 8:
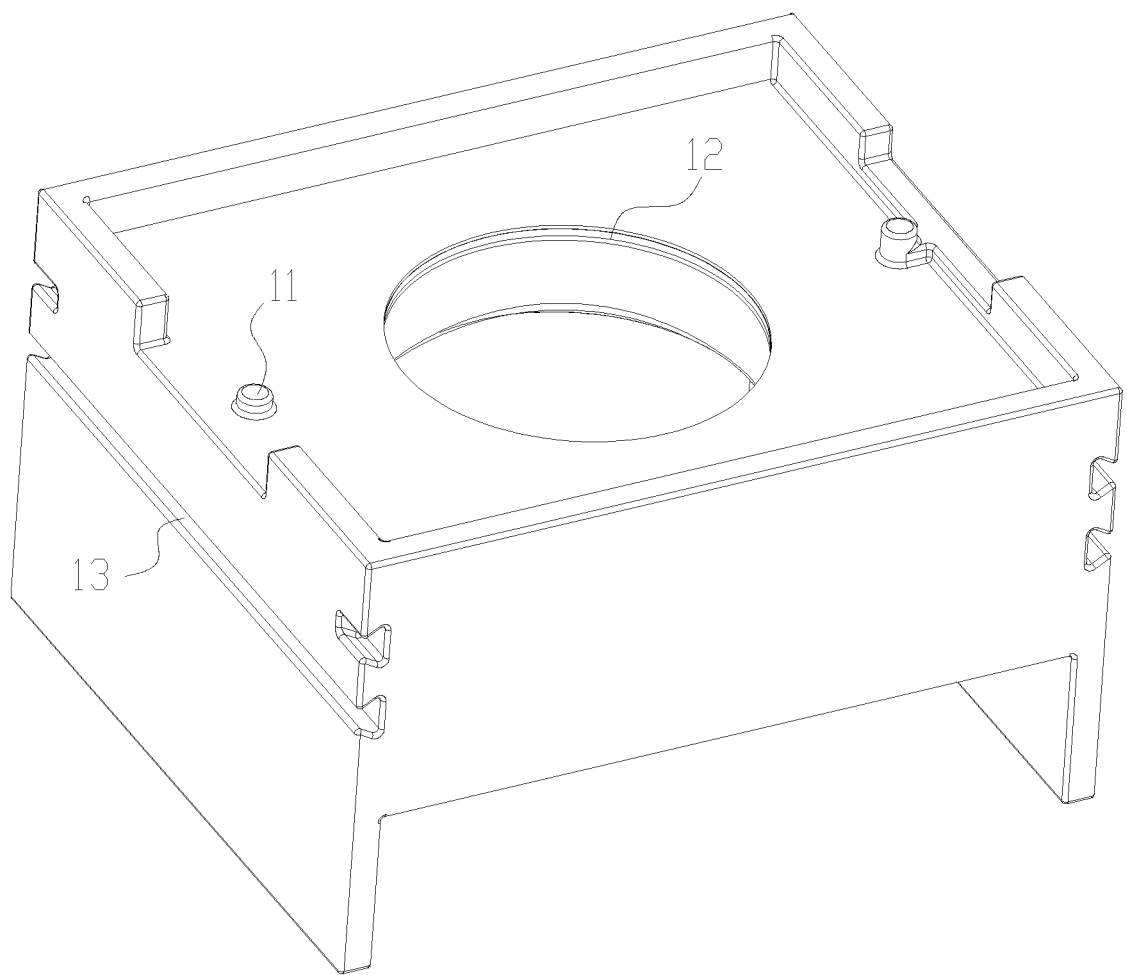
FIG. 8 is a schematic view of a mounting bracket illustrated according to an exemplary embodiment.

As illustrated in FIGS. 5 and 8, the first movable member 221 and the second movable member 222 are slidably arranged to the mounting bracket 10, and the blade assembly 30 is connected to the first movable member 221 and the second movable member 222 respectively and rotates under the driving of the driving set 21. In an embodiment, the first movable member 221 is provided with a sliding part 2211 and a movable part 2212 defined by a part of surface of the sliding part 2211 which is sunk, the sliding part 2211 is slidably connected to the mounting bracket 10, and at least a part of the blade assembly 30 is inserted into the movable part 2212 and rotates under a pushing action of a side wall of the movable part 2212.

The sliding part 2211 is slidably mounted to the sliding groove 13 of the mounting bracket 10. Optionally, the sliding groove 13 is configured as a structure similar to T, a dovetail slot, or other structures for limiting the position of the sliding part 2211. The sliding part 2211 is slidably arranged to the sliding groove 13 and transfers a force on itself to the mounting bracket 10 through the sliding groove 13, to ensure that the positions of the first movable member 221 and the second movable member 22 relative to the mounting bracket 10 remain unchanged.

Figure 9:
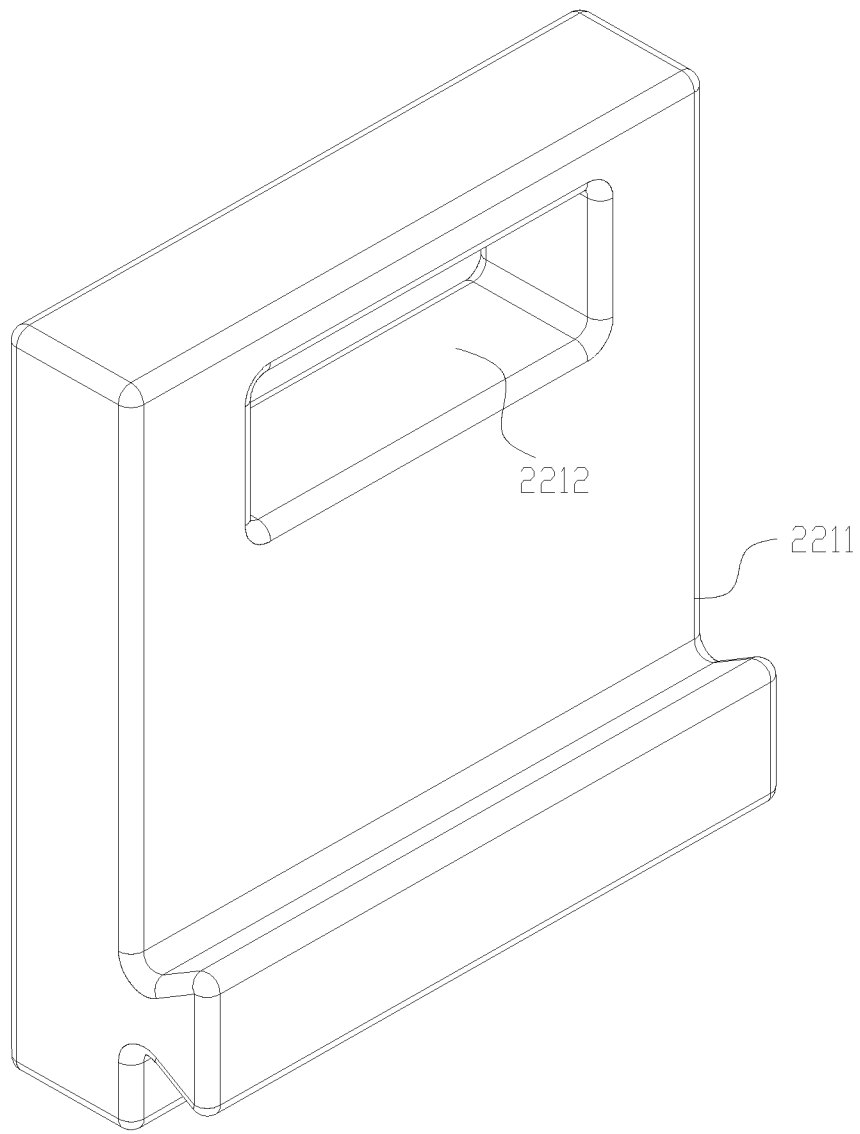
FIG. 9 is a schematic view of a first movable member illustrated according to an exemplary embodiment.

As illustrated in FIGS. 5 and 9, the movable part 2212 is a structure of a groove or hole which recesses from a part of the surface of the sliding part 2211, and a part of the blade assembly 30 is inserted into the movable part 2212, to enable the side wall of the movable part 2212 to push the blade assembly 30 to move. In an optional embodiment, the movable part 2212 is configured as a structure of an elongated hole, and the protruding part 312 of the blade assembly 30 is inserted into the movable part 2212. When the first electromagnet 2111 is energized and guides the first movable member 221 to slide along the sliding groove 13, one side wall of the movable part 2212 pushes the protruding part 312 to move, the first blade 31 rotates about the shaft 11, such that the axis of a small aperture 33 coincides with the optical axis of the lens component 40. When the second electromagnet 2112 is energized and guides the first movable member 221 to slide along the sliding groove 13, the other side wall of the movable part 2212 pushes the protruding part 312 to move, the first blade 31 rotates about the shaft 11, such that the axis of a large aperture 33 coincides with the optical axis of the lens component 40.

As illustrated in FIGS. 1 and 2, in an embodiment, the lens component 40 includes a module body 42 and a lens member 41 mounted to the module body 42. The module body 42 is mounted to the mounting bracket 10, and the lens member 41 is oriented towards the aperture 33 of the blade assembly 30. The lens member 41 is arranged corresponding to the lens hole 12 of the mounting bracket 10, and the optical axis of the lens member 41 coincides with the axis of the aperture 33. The module body 42 is mounted to the mounting bracket 10, or the module body 42 is mounted to other devices and limited to the mounting bracket 10, contributing to good positioning effect.

In an optional embodiment, the lens component 40 further includes a sealing member 50, and the sealing member 50 surrounds the lens member 41 and is sealingly connected to the mounting bracket 10. The sealing member 50 is made of an elastic material, such as foam, a seal ring, etc. The sealing member 50 is sealingly attached to the mounting bracket 10 and the module body 42, thereby preventing the moisture and impurities from entering the lens module, contributing to stable overall performance.

The lens module disclosed in the above-described embodiments can be applied in a mobile terminal. In an embodiment, the mobile terminal includes a processor and a memory configured to store executable instruction of the processor. The mobile terminal further includes a lens module according to the above-described embodiments, and the lens module and the processor establish a communication connection therebetween.

Figure 10:
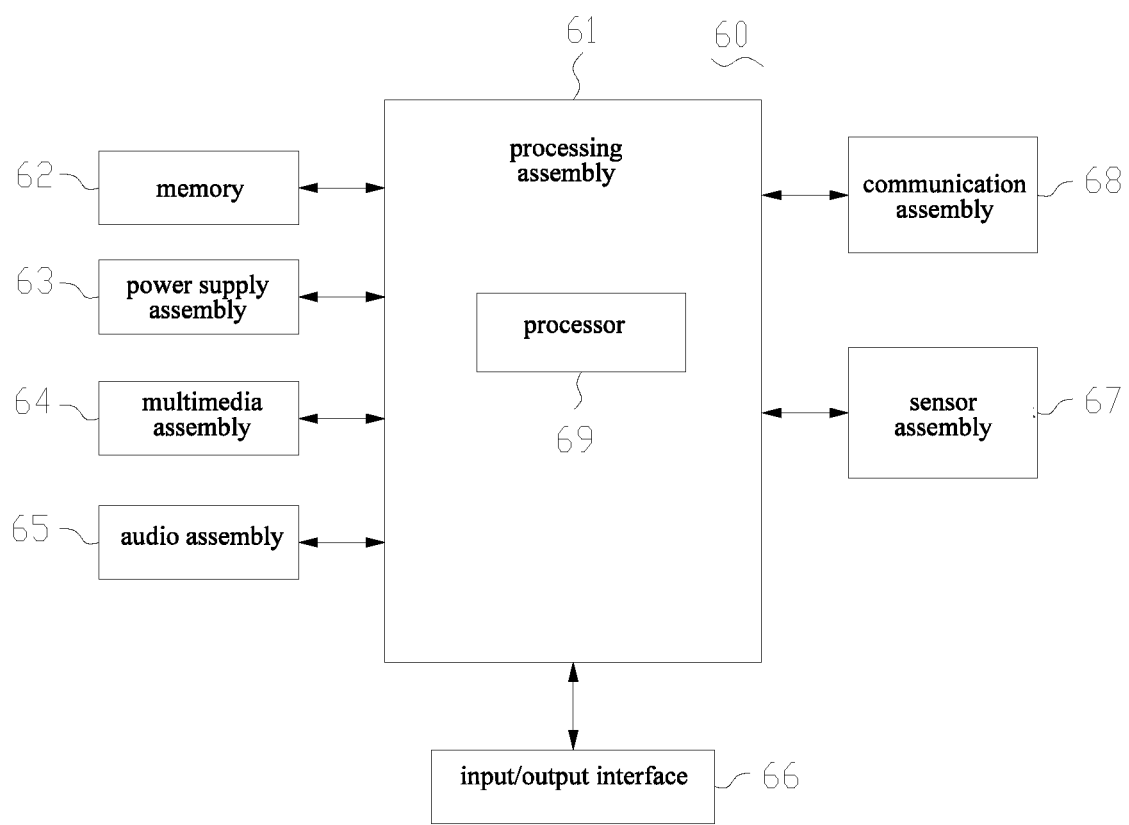
FIG. 10 is a block diagram of a mobile terminal illustrated according to an exemplary embodiment.

As illustrated in FIG. 10, in an optional implementation, the mobile terminal 60 can be a mobile phone, a computer, a digital broadcast terminal, a messaging device, a game console, a tablet device, a medical device, a fitness device, a personal digital assistant, a translator, etc.

The mobile terminal 60 may include one or a plurality of the following assemblies: a processing assembly 61, a memory 62, a power supply assembly 63, a multimedia assembly 64, an audio assembly 65, an input/output (I/O) interface 66, a sensor assembly 67, and a communication assembly 68.

The processing assembly 61 generally controls overall operation of the mobile terminal 60, such as operations related to display, call, data communication, camera and record. The processing assembly 61 may include one or a plurality of processors 69 to execute instructions, so as to achieve all or a part of steps of the above-described method. Additionally, the processing assembly 61 may include one or a plurality of modules, facilitating interaction between the processing assembly 61 and other assemblies. In an optional implementation, the processing assembly 61 may include a multimedia module, thereby facilitating interaction between the multimedia assembly 64 and the processing assembly 61.

The memory 62 is configured to store various types of data to support the operations of the mobile terminal 60. Examples of these data include instructions, contact data, telephone book data, messages, pictures, videos, etc. for any application or method operated on the mobile terminal 60. The memory 62 may be realized by any type of volatile, or non-volatile storage devices or combination thereof, such as a static random access memory 62 (SRAM), an electrically erasable programmable read only memory 62 (EEPROM), an erasable programmable read only memory 62 (EPROM), a programmable read only memory 62 (PROM), a read only memory 62 (ROM), a magnetic memory 62, a flash memory 62, a magnetic or optical disk.

The power supply assembly 63 provides power for various assemblies of the mobile terminal 60. The power supply assembly 63 may include a power management system, one or a plurality of power sources, and other assemblies associated with generating, managing and distributing power.

The multimedia assembly 64 includes a screen providing one output interface between the mobile terminal 60 and the user. In some embodiments, the screen may include a liquid crystal display (LCD), and a touch panel (TP). If the screen includes the touch panel, the screen may be realized as a touch screen, so as to receive an input signal from the user. The touch panel includes one or a plurality of touch sensors to sense touch, swipe and gesture on the touch panel. The touch sensor not only can sense the boundary of the touch or swipe action, but also can detect duration time and pressure related to the touch or swipe operation. In in some embodiments, the multimedia assembly 64 includes a front camera and/or a rear camera. When the mobile terminal 60 is in an operation mode, such as in a photographing or video mode, the front camera and/or the rear camera can receive external multimedia data. Each of the front camera and the rear camera may be a fixed optical lens system or has a focal length and optical zoom capability.

The audio assembly 65 is configured to output and/or input an audio signal. In in an optional implementation, the audio assembly 65 includes a microphone (MIC). The microphone is configured to receive external audio signal when the mobile terminal 60 is in the operation mode, such as in a call mode, a record mode and a speech recognition mode. The received audio signal can be further stored in the memory 62 or transmitted via the communication assembly 68. In some embodiments, the audio assembly 65 further includes a speaker configured to output the audio signal.

The input/output (I/O) interface provides interfaces between the processing assembly 61 and peripheral interface modules, and the forgoing peripheral interface module may be a keyboard, a click wheel, a button, etc. The button may include but not limited to a homepage button, a volume button, a start button and a lock button.

The sensor assembly 67 includes one or a plurality of sensors configured to provide state assessments of various aspects of the mobile terminal 60. In an optional implementation, the sensor assembly 67 may detect on/off state of the device, relative positioning of assemblies. In an optional implementation, the assemblies may be a display and a keypad of the mobile terminal 60. The sensor assembly 67 may further detect positional variation of the mobile terminal 60 or one assembly of the mobile terminal 60, presence or absence of contact between the user and the mobile terminal 60, orientation or acceleration/deceleration of the mobile terminal 60 and temperature variation of the mobile terminal 60. The sensor assembly 67 may include a proximity sensor configured to detect presence of nearby objects without any physical contact. The sensor assembly 67 may also include an optical sensor, such as a COMS or CCD image sensor configured to use in an imaging application. In some embodiments, the sensor assembly 67 may further include an acceleration sensor, a gyro sensor, a magnetic sensor, a pressure sensor or a temperature sensor.

The communication assembly 68 is configured to facilitate wired or wireless communication between the mobile terminal 60 and other devices. The mobile terminal 60 may access to wireless network based on communication standard, such as WiFi, 2G, 3G, 4G, 5G, or combination thereof. In an exemplary embodiment, the communication assembly 68 receives a broadcast signal or information related to the broadcast from an external broadcast management system. In an exemplary embodiment, the communication assembly 68 further includes a near-field communication (NFC) module to promote short range communication. In an optional implementation, the NFC module may be realized based on a radio frequency identification (RFID) technology, an infrared data association (IrDA) technology, an ultra-wide band (UWB) technology, a Bluetooth (BT) technology and other technologies.

In an exemplary embodiment, the mobile terminal 60 may be realized by one or a plurality of application specific integrated circuits (ASIC), digital signal processors 69 (DSP), digital signal processing equipment (DSPD), programmable logic devices (PLD), field-programmable gate arrays (FPGA), controllers, microcontrollers, microprocessors 69 or other electronic elements configured to execute the above-described method.

Those described above are only preferred embodiments of the present disclosure and are not intended to limit the present disclosure. Any modifications, equivalent substitutions, improvements, and the like within the spirit and principle of the present disclosure should be included in the protection scope of the present disclosure.

What is claimed is:

1. A lens module, comprising:
a mounting bracket;
a lens component having an optical axis that is mounted to the mounting bracket;
a blade assembly movably connected to the mounting bracket and provided with at least two apertures of different diameters, each aperture having an axis that is parallel to the optical axis of the lens component; and
a driving assembly connected to the blade assembly and configured to drive the blade assembly so that the axis of one of the two apertures to is interchangeably aligned with the optical axis of the lens component
wherein the blade assembly comprises a first blade and a second blade, the first blade and the second blade are rotatably connected to the mounting bracket, the driving assembly drives the first blade and the second blade to rotate and close up, and the at least two apertures are defined in a closed-up position of the first blade and the second blade;
the first blade comprises a main body part and a protruding part extending from the main body part, the main body part is rotatably connected to the mounting bracket, the main body part has an outer contour defining two or more arc-shaped notches, the protruding part drives the main body part to rotate under a driving force of the driving assembly, and the first blade and the second blade close up to define the at least two apertures at the arc-shaped notches.

2. The lens module according to claim 1, wherein the first blade and the second blade are symmetrically arranged.

3. The lens module according to claim 1, wherein the main body part is provided with a hole, and the mounting bracket is rotatably connected to the hole.

4. The lens module according to claim 3, wherein distances from centers of the arc-shaped notches to a centerline of the hole are identical.

5. The lens module according to claim 1, the driving assembly further comprising a driving set mounted to the mounting bracket and a movable set slidably coupled to the mounting bracket, wherein:
the blade assembly is movably coupled to the movable set, and
the movable set slides along the mounting bracket and drives the blade assembly to rotate under a driving force of the driving set.

6. The lens module according to claim 5, wherein the driving set is coupled to the movable set through magnetic induction.

7. The lens module according to claim 5, the driving set further comprising a first driving member that is mounted to the mounting bracket, the movable set further comprising a first movable member,
wherein at least a part of the blade assembly is connected to the first movable member, and the first movable member drives the blade assembly to rotate under driving of the first driving member.

8. The lens module according to claim 7, the driving set further comprising a second driving member mounted to the mounting bracket and arranged opposite the first driving member, the movable set further comprising a second movable member arranged opposite the first movable member,
wherein the blade assembly is connected to the first movable member and the second movable member separately, and the second movable member drives the blade assembly to rotate under driving of the second driving member.

9. The lens module according to claim 8, wherein the second driving member and the first driving member are symmetrically arranged.

10. The lens module according to claim 7, the first driving member further comprising a first electromagnet and a second electromagnet arranged oppositely one another,
wherein at least a part of the first movable member is located between the first electromagnet and the second electromagnet, and the first movable member slides along the mounting bracket under a magnetic force of the first electromagnet or the second electromagnet.

11. The lens module according to claim 7, wherein:
the first movable member is provided with a sliding part and a movable part recessed from a part of a surface of the sliding part,
the sliding part is slidably coupled to the mounting bracket, and at least a part of the blade assembly is inserted into the movable part and is rotated under a pushing action of a side wall of the movable part.

12. The lens module according to claim 1, wherein the mounting bracket is provided with an accommodating space and a lens hole in communication with the accommodating space, the lens component is mounted in the accommodating space, and the optical axis of the lens component is parallel to an axis of the lens hole.

13. The lens module according to claim 12, wherein the mounting bracket is provided with a shaft and at least one sliding groove, the blade assembly is rotatably connected to the shaft, and a part of the driving assembly is slidably arranged to the sliding groove and drives the blade assembly to rotate.

14. The lens module according to claim 13, wherein the shaft is arranged on a top surface of the mounting bracket, and the at least one sliding groove is defined at a side wall of the mounting bracket.

15. The lens module according to claim 1, the lens component further comprising a module body and a lens member mounted to the module body, wherein the module body is mounted to the mounting bracket, and the lens member is oriented towards the at least two apertures of the blade assembly.

16. The lens module according to claim 15, the lens component further comprising a sealing member, wherein the sealing member surrounds the lens member and is sealingly connected to the mounting bracket.

17. A mobile terminal, comprising:
   a processor;
   a memory configured to store instructions of the processor; and
   a lens module that operates under the control of the processor executing the instructions and comprising:
      a mounting bracket defining a hole;
      a lens member mounted to the mounting bracket and located under the hole;
      a blade assembly movably connected to the mounting bracket and provided with at least two apertures of different diameters; and
      a driving assembly connected to the blade assembly and driving the blade assembly to rotate and switch the at least two apertures to correspond to the lens component, such that an axis of one of the at least two apertures coincides with an optical axis of the lens component,
   wherein the blade assembly comprises a first blade and a second blade, the first blade and the second blade are rotatably connected to the mounting bracket, the driving assembly drives the first blade and the second blade to rotate and close up, and the at least two apertures are defined in a closed-up position of the first blade and the second blade, and
   wherein the first blade comprises a main body part and a protruding part extending from the main body part, the main body part is rotatably connected to the mounting bracket, the main body part has an outer contour defining two or more arc-shaped notches, the protruding part drives the main body part to rotate under a driving force of the driving assembly, and the first blade and the second blade close up to define the at least two apertures at the arc-shaped notches.

* * * * *